M. HANDWERCK.
HOLLOW ARTICLE MADE OF PAPER, CLOTH, AND THE LIKE.
APPLICATION FILED JAN. 20, 1913.
1,106,211. Patented Aug. 4, 1914.
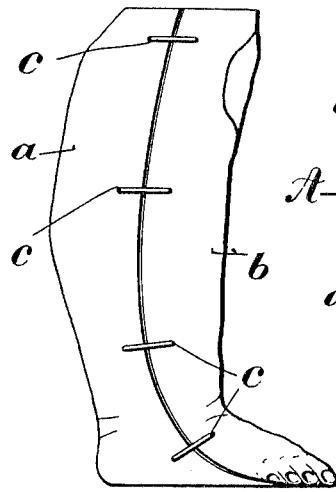
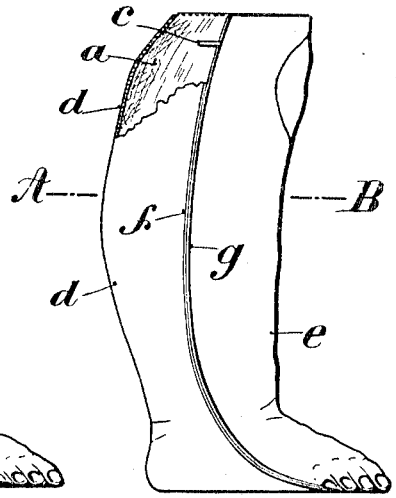
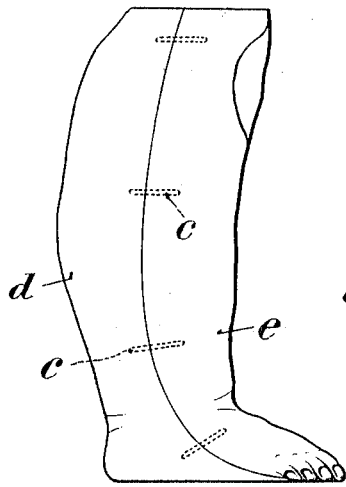
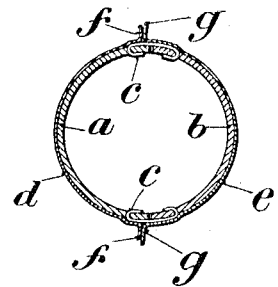
Witnesses:
Inventor
Max Handwerck
by
Attorney

UNITED STATES PATENT OFFICE.

MAX HANDWERCK, OF WALTERSHAUSEN, GERMANY.

HOLLOW ARTICLE MADE OF PAPER, CLOTH, AND THE LIKE.

1,106,211.  Specification of Letters Patent.  Patented Aug. 4, 1914.

Application filed January 20, 1913. Serial No. 743,182.

*To all whom it may concern:*

Be it known that I, MAX HANDWERCK, a subject of the German Emperor, residing at Waltershausen, Duchy of Saxe-Coburg-Gotha, Germany, have invented certain new and useful Improvements in Hollow Articles Made of Paper, Cloth, and the like, of which the following is a specification.

The present invention refers to a process of manufacturing hollow bodies of various kinds, such for example as the bodies of dolls and animals, separate limbs and parts thereof and the like being composed of very thin material such as paper, cloth, or any other suitable material.

It has for its objects primarily to effect greater economy in the manufacture of such articles, and to increase the wearing qualities, strength and durability thereof.

The invention consists substantially in first punching or stamping two halves of a hollow body from exceedingly thin material, for example, very thin sheets of paper, cloth, or their equivalents; next, to secure together these halves of the body by pins inserted at their butt-jointed or more or less overlapping edges, and finally applying to the structure so made two halves of a hollow body of a slightly larger size made by somewhat larger stamping tools, the inner and outer bodies being united by sizing, cement brazing or the like. The last-mentioned outer halves then inclose completely the first-mentioned halves of the hollow body which are secured together by pins, the outer halves of the hollow body, which consist of a very thin material, then being united to one another by flanges which are formed on their meeting edges and may be subsequently trimmed off, by overlapping the adjacent or meeting edges of these outer halves of the body. Thus it will be understood that the stamping of the halves which compose the body consists of a method having two steps with the advantage that in both steps of the method only exceedingly thin materials are used which can be handled easily and quickly, only a slight compressive strength being needed in stamping the halves of the body, so that both the outer and inner halves of the hollow body can be made with economy in time and cost of materials.

A further advantage of the present method is that the connecting seam between the halves of the article is practically imperceptible, although the seam or joint between the halves of the body, possesses great strength.

In applying the outer body to the inner body, the seam uniting the outer halves of the body may be either superposed upon the joint between the inner halves, or the seam or joint of the outer halves of the body may be offset either forwardly or rearwardly of the seam or joint of the inner halves of the bodies.

In order to explain the method, reference is made to the accompanying drawing which shows an example of a method of manufacturing an intricate hollow body, such as the leg of a doll.

In this drawing, in which the same characters of reference refer to the same parts throughout the several views, Figure 1 shows the inter-connected inner halves of a hollow body; Fig. 2 illustrates the article at another stage of the process; Fig 3 represents a section on the line A—B of Fig. 2; Fig. 4 shows the finished article.

The two halves of the hollow body, *a* and *b*, are first made of exceedingly thin material, these parts being substantially connected at their abutting edges by pins *c*, or their equivalents, as will be understood from Fig. 1. At the same time that the two halves *a* and *b* are made, somewhat larger stamping tools are used to make the two larger halves *d* and *e*, which fit over the parts *a* and *b*. This may be accomplished in two different ways; either the two parts *d* and *e* may be fitted with out-turned flanges *f* and *g*, as shown in Fig. 3, or one of the halves of hollow body, say the part *d*, may overlap the adjacent edge of the other half of the body, such as the part *e*, as far as required, to secure a firm joint. The two halves *d* and *e* of the hollow body manufactured in this way are now applied, with the aid of a glutinous substance or the like, to the halves *a* and *b* of the body, said halves *a* and *b* having been previously connected by pins *c* or the like, so that the inner halves *a* and *b* of the body are completely inclosed by the outer halves *d* and *e*. The partially completed article is next subjected to a compression, the two outer halves *d* and *e* being firmly united with the inner halves *a* and *b*. Thereafter, the out-turned flanges *f* and *g* on the parts *d* and *e* are cut off. Also, in using the joint flanges *f* and *g*, an overlapping of these flanges may be produced by making one of the outer halves slightly larger than the other half.

The outer halves may be so applied to the inner structure that the joint between the outer halves will coincide with the joint between the inner halves, or the joints between the inner and outer parts may be offset, as shown in Fig. 3. To obtain this effect, one of the outer sections, the section $c$ in the present instance, is made larger than the other section.

I claim as my invention:—

1. An article of manufacture consisting of a hollow body composed of two inner halves of thin substantially non-resistant material joined together at the edges of such halves, and two outer halves of thin substantially non-resistant material somewhat larger in size and having the same shape as the inner halves, the outer halves being applied over the inner halves and united thereto by a glutinous substance, thereby forming a substantially rigid resistive body, the adjacent edges of the outer halves being united to form a joint.

2. A hollow article of the class described consisting of two inner halves of thin material having their edges brought together and fastened, and two outer halves of thin material and of larger size, the outer halves being applied over the inner halves and united thereto by an interposed coating of adhesive substance, one of the outer halves being larger than the other whereby the meeting edges of the outer halves will be offset relatively to the joint between the inner halves, the meeting edges of the outer halves being united to form a seam or joint.

3. As an article of manufacture, a hollow body comprising segmental inner halves of thin substantially non-resistant material, such halves having their edges brought together, pins fastening together such meeting edges, and segmental outer halves also of thin substantially non-resistant material of larger size than and applied over and secured to the inner halves by an adhesive, the meeting edges of the outer halves being offset relatively to the meeting edges of the inner halves, the meeting edges of the outer halves being united to form a practically imperceptible joint.

In testimony whereof I have hereunto set my hand in presence of two subscribing witnesses.

MAX HANDWERCK.

Witnesses:
 ERNST EVERHARDT,
 ALFRED HOFFMANN.

---

Copies of this patent may be obtained for five cents each, by addressing the "Commissioner of Patents. Washington, D. C."